United States Patent
Armstrong

(10) Patent No.: US 10,647,438 B2
(45) Date of Patent: May 12, 2020

(54) VARIABLE PITCH FOR COORDINATED CONTROL

(71) Applicant: Rolls-Royce North American Technologies, Inc., Indianapolis, IN (US)

(72) Inventor: Michael James Armstrong, Avon, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 659 days.

(21) Appl. No.: 15/371,757

(22) Filed: Dec. 7, 2016

(65) Prior Publication Data

US 2018/0155040 A1    Jun. 7, 2018

(51) Int. Cl.
*F02C 9/58* (2006.01)
*F02C 9/20* (2006.01)
(Continued)

(52) U.S. Cl.
CPC ............. *B64D 27/24* (2013.01); *B64D 27/10* (2013.01); *F02C 9/58* (2013.01); *F02K 3/00* (2013.01);
(Continued)

(58) Field of Classification Search
CPC .. F02C 3/107; F02C 3/113; F02C 7/32; F02C 7/36; F02C 9/16; F02C 9/20; F02C 9/28; F02C 9/58; F02K 3/065; F05D 2220/76; F05D 2220/764; F05D 2220/7642; F05D 2260/70; F05D 2260/74; F05D 2270/02;
(Continued)

(56) References Cited

U.S. PATENT DOCUMENTS 4,928,241 A * 5/1990 Day .................. B64C 11/48
416/34
5,899,411 A   5/1999 Latos et al.
(Continued)

OTHER PUBLICATIONS

Response to Communication pursuant to Rule 43(1) dated Jun. 18, 2018, from counterpart European Application No. 17205746.5, filed Nov. 27, 2018, 19 pp.
(Continued)

*Primary Examiner* — Steven M Sutherland
*Assistant Examiner* — James P McGlynn
(74) *Attorney, Agent, or Firm* — Shumaker & Sieffert, P.A.

(57) ABSTRACT

A system is described that includes a turbine engine including an engine fan including one or more variable-pitch blades driven by a shaft, which rotates at a rotational speed which depends on a pitch of the one or more variable-pitch blades of the engine fan. The system further includes a generator configured to produce alternating-current (AC) electricity at a particular frequency relative to the rotational speed of the shaft. The system also includes a propulsor, which includes a propulsor motor and a propulsor fan. The propulsor motor is configured to drive, based on the AC electricity produced by the generator, the propulsor fan. The system includes a controller configured to control the particular frequency of the AC electricity by at least controlling the pitch of the one or more variable-pitch blades of the engine fan and thereby the rotational speed of the generator.

20 Claims, 12 Drawing Sheets

(51) Int. Cl.
*B64D 27/24* (2006.01)
*B64D 27/10* (2006.01)
*F04D 29/36* (2006.01)
*H02K 7/18* (2006.01)
*F02K 5/00* (2006.01)
*F02K 3/00* (2006.01)
*B64D 27/02* (2006.01)

(52) U.S. Cl.
CPC .............. *F02K 5/00* (2013.01); *F04D 29/362* (2013.01); *H02K 7/1823* (2013.01); *B64D 2027/026* (2013.01); *F02C 9/20* (2013.01); *F05D 2220/7642* (2013.01); *F05D 2260/70* (2013.01); *F05D 2270/061* (2013.01)

(58) Field of Classification Search
CPC ........... F05D 2270/06; F05D 2270/061; B64C 11/30; B64C 11/46; B64C 11/48; B64C 11/50; B64D 27/10; B64D 27/24; B64D 35/04; B64D 35/08; B64D 2027/026; F01D 7/00; F01D 7/02; F04D 29/362

See application file for complete search history.

(56) References Cited

U.S. PATENT DOCUMENTS

| | | | |
|---|---|---|---|
| 5,903,115 A * | 5/1999 | Taylor | H02P 5/74 318/34 |
| 7,710,058 B2 | 5/2010 | Rozman et al. | |
| 7,843,175 B2 | 11/2010 | Jakeman et al. | |
| 8,039,983 B2 * | 10/2011 | Cote | H02P 9/04 290/32 |
| 8,076,814 B2 | 12/2011 | Tupper et al. | |
| 2011/0025157 A1 | 2/2011 | Blackwelder et al. | |
| 2013/0094963 A1 | 4/2013 | Rolt | |
| 2014/0356135 A1 | 12/2014 | French et al. | |
| 2015/0013306 A1 | 1/2015 | Shelley | |
| 2015/0263658 A1 | 9/2015 | Benya, Jr. et al. | |
| 2015/0367950 A1 | 12/2015 | Rajashekara et al. | |
| 2016/0257416 A1 * | 9/2016 | Himmelmann | B64D 27/02 |
| 2016/0340051 A1 | 11/2016 | Edwards et al. | |
| 2017/0107914 A1 * | 4/2017 | Lu | F02C 9/54 |
| 2017/0297727 A1 * | 10/2017 | Niergarth | B64D 27/02 |

OTHER PUBLICATIONS

Invitation Pursuant to Rule 62a(1) EPC from counterpart European Application No. 17205746.5, dated Mar. 27, 2018, 2 pp.
Extended Search Report from counterpart European Application No. 17205746.5, dated May 2, 2018, 8 pp.

* cited by examiner

US 10,647,438 B2

VARIABLE PITCH FOR COORDINATED CONTROL

TECHNICAL FIELD

This disclosure relates to distributed propulsion systems.

BACKGROUND

A turbine engine is a type of combustion system that may be used to power a system such as an aircraft, other moving vehicles, or an electric generator. The turbine engine may be configured to rotate a shaft. The turbine engine may be configured to rotate the shaft to drive an electric generator that is configured to produce electricity based on the rotation of the shaft. An electrical bus may deliver the electricity produced by the generator to a motor, such as a propulsor motor that drives a fan used for propulsion.

SUMMARY

In some examples, the disclosure describes a system that includes a turbine engine including an engine fan including one or more variable-pitch blades driven by a shaft which rotates at a rotational speed which depends on a pitch of the one or more variable-pitch blades. The system further includes a generator configured to produce alternating-current (AC) electricity at a particular frequency relative to the rotational speed of the shaft. The system further includes a propulsor which includes a propulsor motor and a propulsor fan. The propulsor motor is configured to drive the propulsor fan, based on the AC electricity produced by the generator. The system includes a controller configured to control the particular frequency of the AC electricity by at least controlling the pitch of the one or more variable-pitch blades of the engine fan and thereby the rotational speed of the generator.

In some examples, the disclosure describes a method for generating propulsion, the method including determining a propulsion for a propulsion fan driven by a propulsor motor based on a particular frequency of alternating-current (AC) electricity; determining a pitch of one or more variable-pitch blades of an engine fan of a turbine engine to cause a shaft of the turbine engine to rotate at a rotational speed to cause a generator to produce the particular frequency of AC electricity, and controlling the pitch of the one or more variable-pitch blades to cause the generator to produce the AC electricity at the particular frequency and the propulsor motor to drive the propulsor fan to generate the propulsion based on the AC electricity.

In some examples, the disclosure describes a system including a first turbine engine including a first engine fan including one or more variable-pitch blades driven by a first shaft which rotates at a speed which depends on a pitch of the one or more variable-pitch blades of the first engine fan. The system also includes a first generator configured to produce, based on a rotation of the first shaft, first alternating-current (AC) electricity at a first frequency relative to the rotational speed of the first shaft. The system further includes a second turbine engine including a second engine fan including one or more variable-pitch blades driven by a second shaft which rotates at a speed which depends on a pitch of the one or more variable-pitch blades of the second engine fan. The system may also include a second generator configured to produce second alternating-current (AC) electricity at a second frequency relative to the rotational speed of the second shaft. The system further includes a propulsor including a propulsor fan and a propulsor motor configured to drive the propulsor fan, selectively based on the first AC electricity produced by the first generator or the second AC electricity produced by the second generator.

The details of one or more examples are set forth in the accompanying drawings and the description below. Other features, objects, and advantages will be apparent from the description and drawings, and from the claims.

DETAILED DESCRIPTION

In general, this disclosure describes techniques for implementing an example synchronous alternating-current (AC) electrical system that includes a turbine engine with a variable-pitch engine fan and is configured to adjust the pitch of the variable-pitch blades to (at least partially) control the rotational speed of a shaft of the turbine engine. A generator of the example system is coupled to the shaft and produces AC electricity that has a frequency that is based on the rotational speed of the shaft. The example system includes a propulsor motor that drives a propulsor fan based on the AC electricity produced by the generator and the example system may control the rotational speed of the shaft and the amount of propulsion generated by the propulsor fan by adjusting the by adjusting the pitch of the variable-pitch blades. In other words, by adjusting the pitch of the variable-pitch blades of the engine fan, the example system may control the frequency of the AC electricity that is driving the propulsor fan to affect the rotational speed of the propulsor fan and thereby the amount of propulsion produced. In this way, the amount of propulsion generated by the propulsor fan may be based on the frequency of the AC electricity produced by the generator, which may be based on the pitch of the variable-pitch blades of the engine fan.

Figure 1:
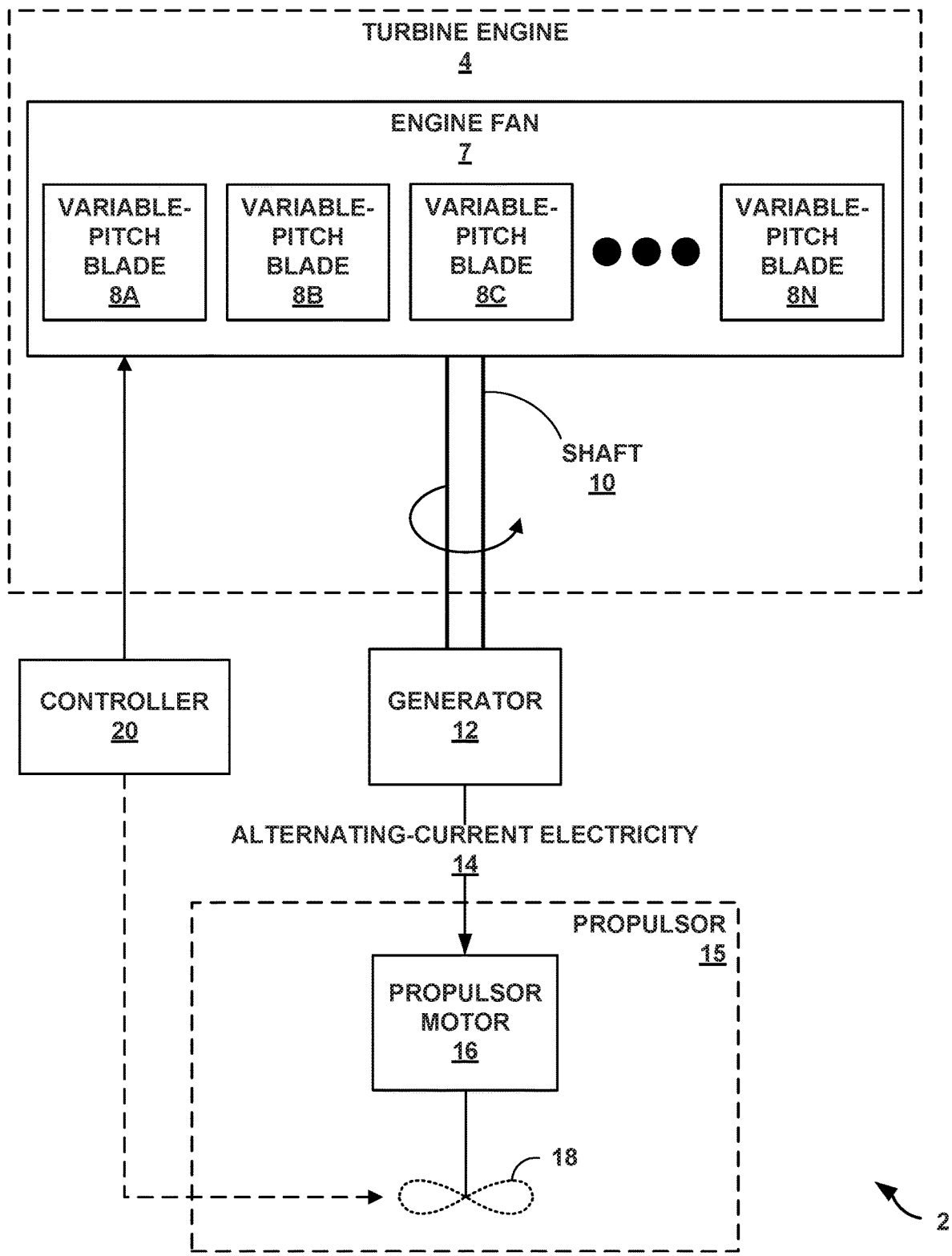
FIG. 1 is a conceptual block diagram illustrating a synchronous alternating-current (AC) electrical system including a variable-pitch turbine engine and a propulsor motor that drives a propulsor fan based on the AC electricity produced by a generator connected to the turbine engine, in accordance with one or more techniques of this disclosure.

FIG. 1 is a conceptual block diagram illustrating a synchronous alternating-current (AC) electrical system 2 including a variable-pitch turbine engine 4 and a propulsor motor 16 that drives a propulsor fan 18 based on the AC electricity 14 produced by a generator 12 connected to the turbine engine 4, in accordance with one or more techniques of this disclosure. Synchronous AC electrical system 2 may be configured to deliver AC electricity 14 to propulsor 15, where propulsor motor 16 may drive propulsor fan 18. The propulsion created by propulsor fan 18 may be used in a variety of ways or for a variety of systems and applications (e.g., aircraft, locomotives, watercraft, power plants, electric generators, and any or all other systems and applications that rely on mechanical energy from a turbine engine to perform work).

Turbine engine 4 is configured to rotate shaft 10. Turbine engine 4 may include engine fan 7 with variable-pitch blades 8A-8N, at least a portion of shaft 10, and additional components necessary to rotate shaft 10 that are not shown in FIG. 1. In some examples, turbine engine 4 may include generator 12, and generator 12 may be positioned inside of turbine engine 4. In other examples, generator 12 may be separate from turbine engine 4 and generator 4 may be positioned outside of turbine engine 4. Turbine engine 4 may be a gas turbine engine, a nuclear turbine engine, a steam turbine engine, or any other suitable turbine engine.

Variable-pitch blades 8A-8N of engine fan 7 are configured to rotate based on the fluid passing through turbine engine 4 and further configured to cause shaft 10 to rotate based on the movement of fluid through turbine engine 4. Engine fan 7 may be mechanically connected to shaft 10, and shaft 10 of turbine engine 4 may drive engine fan 7 and generator 12. Variable-pitch blades 8A-8N may include an adjustable pitch mechanism such that a pitch of variable-pitch blades 8A-8N determines the speed of rotation of shaft 10. A decrease of the pitch of variable-pitch blades 8A-8N may cause shaft 10 to rotate faster, while an increase of the pitch of variable-pitch blades 8A-8N may cause shaft 10 to rotate slower. For example, a flat pitch on variable-pitch blades 8A-8N may cause shaft 10 to rotate at a high speed for a fixed-power fan.

Shaft 10 is configured to rotate based on mechanical energy from turbine engine 4 and is further configured to rotate based on the pitch of variable-pitch blades 8A-8N. In other words, shaft 10 may rotate at a rotational speed, which depends on a pitch of variable-pitch blades 8A-8N. Shaft 10 may be connected to generator 12 such that shaft 10 drives a rotor in generator 12. Shaft 10 may include a low-pressure (LP) shaft, a high-pressure (HP) shaft, or an auxiliary shaft that is driven by the LP shaft or the HP shaft. The core power of turbine engine 4 may drive the rotation of shaft 10.

Generator 12 is configured to convert mechanical power derived from shaft 10 to electrical power for use by other components or circuits. Generator 12 may be an AC generator such as an induction generator. Generator 12 may be configured to produce AC electricity 14 at a particular frequency based on a rotation of shaft 10. In other words, the particular frequency of AC electricity 14 may be relative to the rotational speed of shaft 10 and based on the speed of engine fan 7. Generator 12 may include a wound field machine, a Halbach array generator with permanent magnets on a rotor that is driven by shaft 10, or any other type of generator. In some examples, generator 12 may be integrated into turbine engine 4 and driven by an LP shaft.

Propulsor 15 includes propulsor motor 16 and propulsor fan 18. Propulsor motor 16 is configured to drive propulsor fan 18 based on AC electricity 14 produced by generator 12. Synchronous AC electrical system 2 may transmit AC electricity 14 from generator 12 to propulsor motor 16. AC electricity 14 may have a single phase or multiple phases, such as three-phase AC electricity. Propulsor motor 16 may be configured to convert electrical energy to mechanical energy to drive propulsor fan 18. The terms "electrical power" and "mechanical power" may refer to rates of consuming or generating electrical energy or mechanical energy.

Propulsor fan 18 is configured to be driven by propulsor motor 16 to generate propulsion based on the mechanical power produced by propulsor motor 16. Propulsor fan 18 may be remote from turbine engine 4. For example, propulsor fan 18 may be positioned on a wing of an aircraft whereas turbine engine 4 may be positioned at or near a fuselage of the aircraft. Propulsor fan 18 may include a boundary layer ingestion (BLI) fan configured to activate the boundary layer of a vehicle. Propulsor fan 18 may include a partially distributed propulsion system, a wing-embedded fan, a blown-wing fan, a wing-tip fan, a surface-mounted BLI fan, and/or any other suitable fan and/or propulsor.

Controller 20 is configured to control the pitch of variable-pitch blades 8A-8N of turbine engine 4 by sending a command to a variable-pitch unit (not shown in FIG. 1). The variable-pitch unit may be configured to adjust the pitch of variable-pitch blades 8A-8N based on the command from controller 20. Controller 20 may monitor the particular frequency of AC electricity 14, and controller 20 may be configured to control the particular frequency of AC electricity 14 by controlling the pitch of variable-pitch blades 8A-8N. Controller 20 may be configured to control the propulsion generated by propulsor fan 18 by controlling the pitch of variable-pitch blades 8A-8N. Controller 20 may also control the rotational speed of generator 12 by controlling the pitch of variable-pitch blades 8A-8N. In some examples, propulsor fan 18 may include one or more variable-pitch blades, and controller 20 may be configured to control the propulsion generated by propulsor fan 18 by controlling the pitch of the one or more variable-pitch blades of propulsor fan 18.

Controller 20 may include any suitable arrangement of hardware, software, firmware, or any combination thereof, to perform the techniques attributed to controller 20 herein. Examples of controller 20 include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 20 includes software or firmware, controller 20 further includes any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 1, controller 20 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 20 (e.g., may be external to a package in which controller 20 is housed).

Although controller 20 is generally described as being the primary unit for controlling each of the components of synchronous AC electrical system 2 for performing the techniques described herein, in some examples, the individual components of synchronous AC electrical system 2 may include additional functionality for performing some or all of the operations described below with respect to controller 20. For example, a combination of one or more of turbine engine 4, generator 12, propulsor motor 16, and propulsor fan 18 may include components for controlling the generation, transmission, and use of AC electricity in synchronous AC electrical system 2.

In accordance with the techniques of this disclosure, propulsor motor 16 may drive propulsor fan 18 based on AC electricity 14 produced by generator 12. The particular frequency of AC electricity 14 may be based on the rotation of shaft 10. The speed of the rotation of shaft 10 may be based on the pitch of variable-pitch blades 8A-8N. Synchronous AC electrical system 2 may control the amount of propulsion generated by propulsor fan 18 by controlling the pitch of variable-pitch blades 8A-8N and by throttling turbine engine 4. The propulsion generated by propulsor fan 18 may be independent of the thrust produced by turbine engine 4. In some examples, the ratio of the rotational speed rotational speed of propulsor fan 18 and the rotational speed of shaft 10 may be a constant value.

As compared to a non-synchronous electrical system, synchronous AC electrical system 2 may include fewer or no power electronics conversion circuits. By reducing or eliminating power electronics, the synchronous AC electrical system may have reduced weight, cost, and maintenance. Synchronous AC electrical system 2 may include additional benefits such as relative simplicity of controlling the particular frequency of AC electricity 14 and relative simplicity of controlling the propulsion generated by propulsor fan 18. A non-synchronous electrical system may control the frequency of AC electricity produced by a generator by throttling the speed of a turbine engine and/or through an AC/AC power converter electrically connected to a generator. Controller 20 may control the particular frequency of AC electricity 14 by controlling the pitch of variable-pitch blades 8A-8N.

A non-synchronous electrical system may control the propulsion generated by a propulsor by throttling the speed of a turbine engine, through a power converter electrically connected to a generator, and/or through a power converter electrically connected to a propulsor motor configured to drive the propulsor fan. Controller 20 may control the propulsion generated by Propulsor fan 18 by controlling the pitch of variable-pitch blades 8A-8N.

Figure 2:
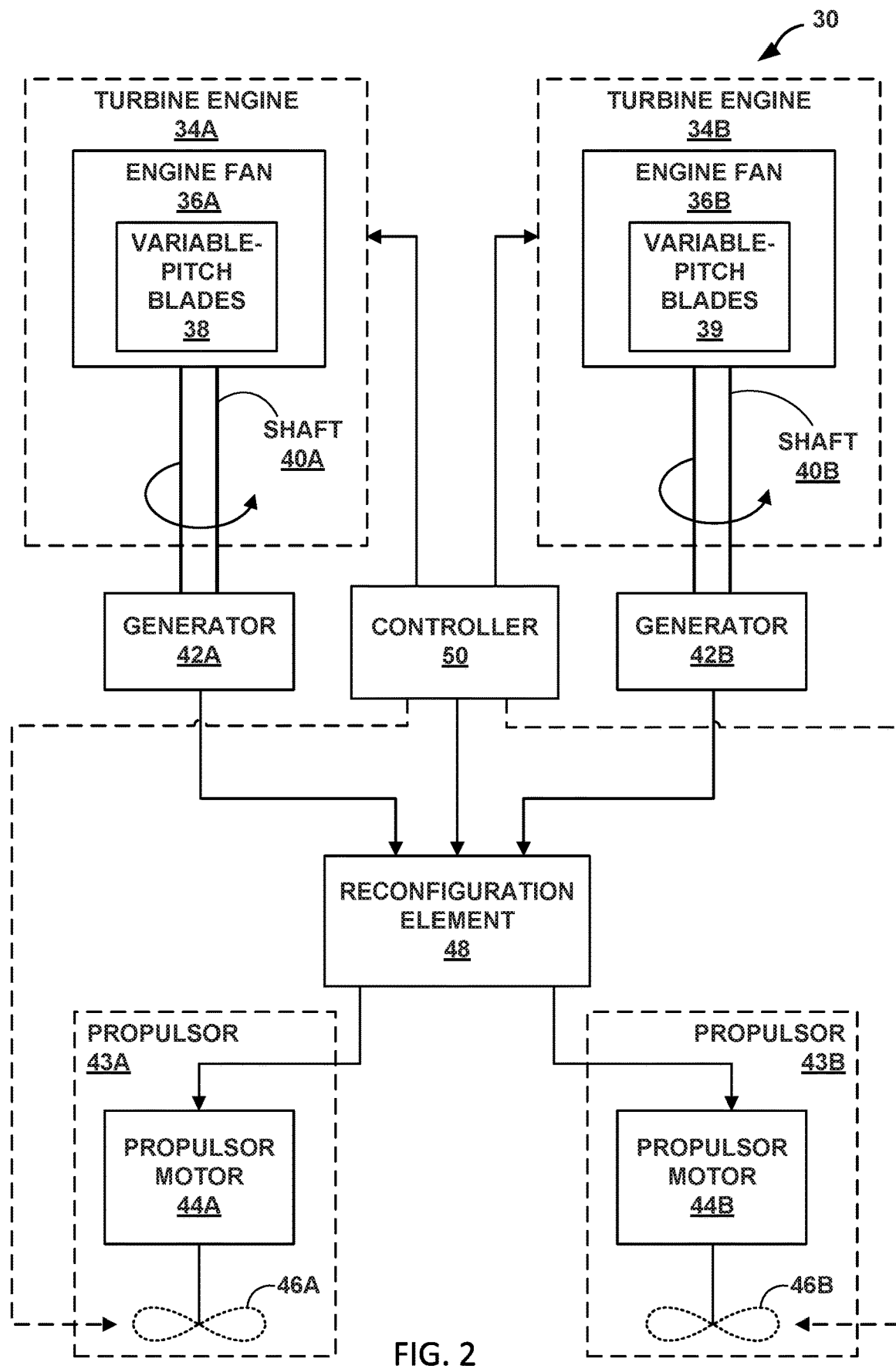
FIG. 2 is a conceptual block diagram illustrating a synchronous AC electrical system including two variable-pitch turbine engines, two generators, two propulsors, and a reconfiguration element configured to selectively transmit AC electricity from the two generators to two propulsor motors, in accordance with one or more techniques of this disclosure.

FIG. 2 is a conceptual block diagram illustrating a synchronous AC electrical system 30 including two turbine engines 34A, 34B with variable-pitch engine fans 36A, 36B, two generators 42A, 42B, two propulsors 43A, 43B, and a reconfiguration element 48 configured to selectively transmit AC electricity from the two generators to two propulsor motors 44A, 44B, in accordance with one or more techniques of this disclosure. Through reconfiguration element 48, synchronous AC electrical system 30 may be configured to selectively deliver electrical power to one or both of propulsor motors 44A, 44B, where propulsor motor 44A may drive propulsor fan 46A and propulsor motor 44B may drive propulsor fan 46B.

Reconfiguration element 48 is configured to selectively transmit AC electricity produced by generator 42A to zero, one, or both of propulsor motors 44A, 44B. Reconfiguration element 48 is also configured to selectively transmit AC electricity produced by generator 42B to zero, one, or both of propulsor motors 44A, 44B. Reconfiguration element 48 may include one or more switches, such as metal-oxide semiconductor field-effect transistors (MOSFETs), insulated-gate bipolar transistors (IGBTs), mechanical interrupters, and/or any other suitable switches.

Controller 50 is configured to control the pitch of variable-pitch blades 38 of engine fan 36A and the pitch of variable-pitch blades 39 of engine fan 36B. Controller 50 may determine the pitch of variable-pitch blades 38 and/or the pitch of variable-pitch blades 39 to cause one or both of shafts 40A, 40B to rotate at a rotational speed to cause one or both of generators 42A, 42B to produce AC electricity at desired frequency. Controller 50 may be configured to selectively cause reconfiguration element 48 to transmit the AC electricity produced by generator 42A to zero, one, or both of propulsor motors 44A, 44B. Controller 50 may be configured to selectively cause reconfiguration element 48 to transmit the AC electricity produced by generator 42B to zero, one, or both of propulsor motors 44A, 44B.

In some examples, one or both of propulsor fans 46A, 46B may include variable-pitch blades. Controller 50 may be configured to adjust the pitch of the variable-pitch blades of propulsor fan 46A and/or the pitch of the variable-pitch blades of propulsor fan 46B. By adjusting the pitch of the variable-pitch blades of one or both of propulsor fans 46A, 46B, controller 50 may control the amount of propulsion generated by propulsor fans 46A, 46B.

Figure 3:
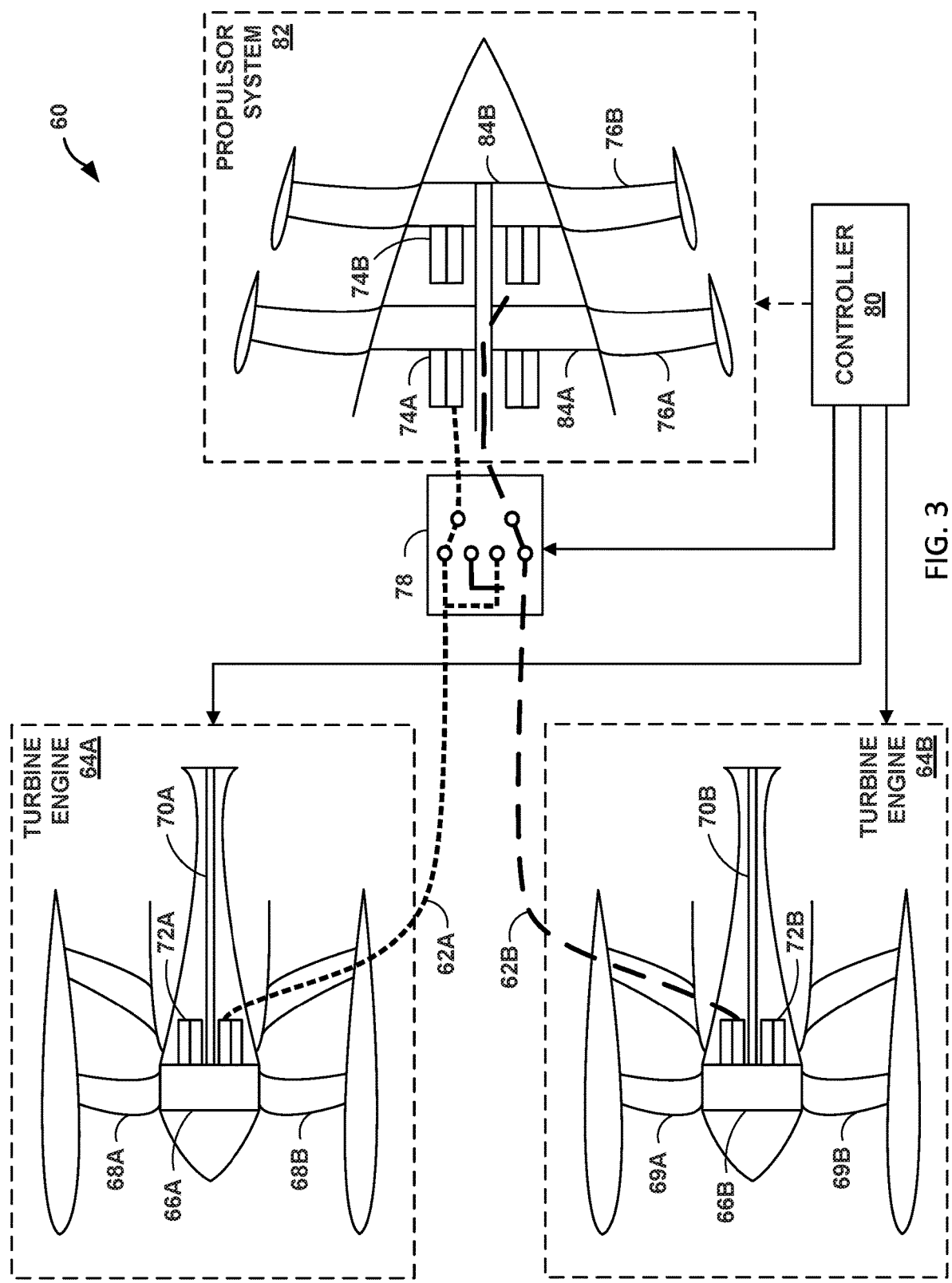
FIG. 3 is a drawing illustrating two turbine engines, two generators, a propulsor system, and a reconfiguration element, in accordance with one or more techniques of this disclosure.

FIG. 3 is a drawing illustrating two turbine engines 64A, 64B, two generators 72A, 72B, propulsor system 82, and a reconfiguration element 78, in accordance with one or more techniques of this disclosure. Turbine engine 64A may include variable-pitch unit 66A for controlling the pitch of variable-pitch blades 68A, 68B. Variable-pitch unit 66A may include a gearbox that is mechanically coupled to variable-pitch blades 68A, 68B.

Shaft 70A may be configured to rotate based on the power provided by the core to the LP turbine as well as the pitch of variable-pitch blades 68A, 68B. Generator 72A may be configured to produce a first AC electricity at a first frequency based on the rotational speed of shaft 70A. Electrical bus 62A may be configured to transmit the first AC electricity produced by generator 72A to reconfiguration element 78. In a similar manner, turbine engine 64B may include variable-pitch unit 66B for controlling the pitch of variable-pitch blades 69A, 69B. Generator 72B may be configured to produce a second AC electricity at a second frequency based on the rotational speed of shaft 70B, which may be based on the pitch of variable-pitch blades 69A, 69B. Electrical bus 62B may be configured to transmit the second AC electricity produced by generator 72B to reconfiguration element 78.

Reconfiguration element 78 may be configured to selectively transmit the first AC electricity produced by generator 72A to zero, one, or both of propulsor motors 74A, 74B. Reconfiguration element 78 may also be configured to selectively transmit the second AC electricity produced by generator 72B to zero, one, or both of propulsor motors 74A, 74B. Reconfiguration element 78 may include one or more switches for directing the first AC electricity and the second AC electricity to propulsor system 82.

Propulsor system 82 may include propulsor fans 76A, 76B, each of which may include two or more blades. In some examples, the blades of propulsor fans 76A, 76B may include variable-pitch blades. Propulsor system 82 may include may include variable-pitch units 84A, 84B for controlling the pitch of the variable-pitch blades of propulsor fans 76A, 76B. Each of variable-pitch units 84A, 84B may include a gearbox that is mechanically coupled to the variable-pitch blades of propulsor fans 76A, 76B. If propulsor fans 76A, 76B include variable-pitch blades, a controller of synchronous AC electrical system 60 may have increased independence in controlling the thrust provided by the propulsor fans 76A, 76B. Variable-pitch blades may also enhance the ability of windmill resynchronization of propulsor fans 76A, 76B.

Propulsor system 82 may include a two-stage fan system, where each of propulsor fans 76A, 76B are a fan stage of propulsor system 82. Reconfiguration element 78 may deliver the first AC electricity to one of propulsor motors 74A, 74B and the second AC electricity to the other of propulsor motors 74A, 74B. Thus, synchronous AC electrical system 60 may not phase lock the first AC electricity and the second electricity. The speeds of turbine engines 64A, 64B may be managed independently by a controller of synchronous AC electrical system 60, where each of turbine engines 64A, 64B drives a separate propulsor of propulsor fans 76A, 76B.

In some examples, propulsor system 82 may include a counter-rotating airfoil rimmed fan system. If propulsor fans 76A, 76B include BLI fans, a counter-rotating airfoil rimmed fans may allow a relatively large stream tube to be captured by each of propulsor fans 76A, 76B. If propulsor fans 76A, 76B capture a large stream tube of fluid, propulsor fans 76A, 76B may have greater impact on the boundary layer.

Controller 80 may be configured to control the pitch of variable-pitch blades 68A, 68B of turbine engine 64A by sending a command to variable-pitch unit 66A. Controller 80 may be configured to control the pitch of variable-pitch blades 69A, 69B of turbine engine 64B by sending a command to variable-pitch unit 66B. Variable-pitch unit 66A, 66B may be configured to adjust the pitch of variable-pitch blades 68A, 68B, 69A, 69B based on the command from controller 80. Controller 80 may monitor the frequencies of the AC electricity produced by generators 72A, 72B, and controller 80 may be configured to control the frequencies of the AC electricity by controlling the pitch of variable-pitch blades 68A, 68B, 69A, 69B. Controller 80 may be configured to control the propulsion generated by propulsor fans 76A, 76B by controlling the pitch of variable-pitch blades 68A, 68B, 69A, 69B. In some examples, propulsor fans 76A, 76B may include one or more variable-pitch blades, and controller 80 may be configured to control the propulsion generated by propulsor fans 76A, 76B by controlling the pitch of the one or more variable-pitch blades of propulsor fans 76A, 76B.

In some examples, controller 80 may be configured to control the pitch of variable-pitch blades on propulsor fans 76A, 76B. By increasing the pitch of the variable-pitch blades on propulsor fans 76A, 76B, controller 80 may increase the load on generators 72A, 72B and reduce the speed of shafts 70A, 70B. A lower speed for shafts 70A, 70B may lead to a lower thrust for turbine engines 64A, 64B.

In some examples, a controller of synchronous AC electrical system 60 may phase-lock the first AC electricity and the second AC electricity. The controller may control the frequency and phase of the first AC electricity by controlling the pitch of variable-pitch blades 68A, 68B through variable-pitch unit 66A. The controller may control the frequency and phase of the second AC electricity by controlling the pitch of variable-pitch blades 69A, 69B through variable-pitch unit 66B. The controller may cause the frequency of the first AC electricity to be equal to frequency of the second AC electricity. The frequencies may be defined as equal if the difference between the frequencies is less than a threshold percentage, such as one percent, five percent, ten percent, or any other suitable percentage. The controller may cause the phase of the first AC electricity to be equal to phase of the second AC electricity. The phases may be defined as equal if the difference between the phases is less than five degrees or less than some other tolerable difference in degree value. Accordingly, this would cause the speeds of the gas turbines to be phase locked. By controlling the components of synchronous AC electrical system 60, controller 80 may control the propulsion generated by each of propulsor fans 76A, 76B, which may provide a greater flexibility and a wider range of operation in, for example, activating a boundary layer near propulsor fans 76A, 76B.

FIGS. 4A-4G are diagrams illustrating reconfiguration elements 78A-78G configured to selectively transmit AC electricity from two generators to two propulsors, in accordance with one or more techniques of this disclosure. For the example depicted in FIG. 4A, electrical bus 62A may be configured to deliver a first AC electricity produced by a first generator to reconfiguration element 78A. Electrical bus 62B may be configured to deliver a second AC electricity produced by a second generator to reconfiguration element 78A.

Figure 4A:
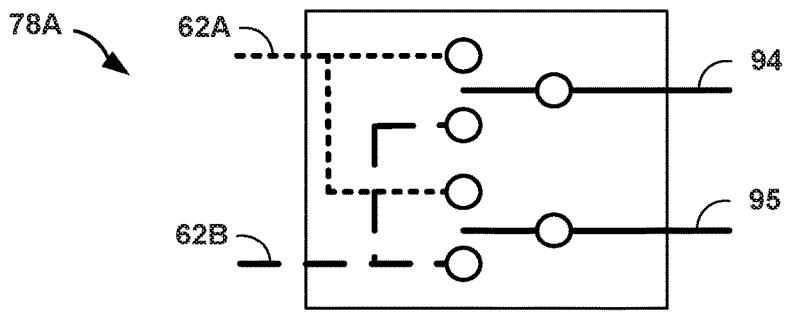
FIGS. 4A-4G are diagrams illustrating reconfiguration elements configured to selectively transmit AC electricity from two generators to two propulsors, in accordance with one or more techniques of this disclosure.
Figure 4B:
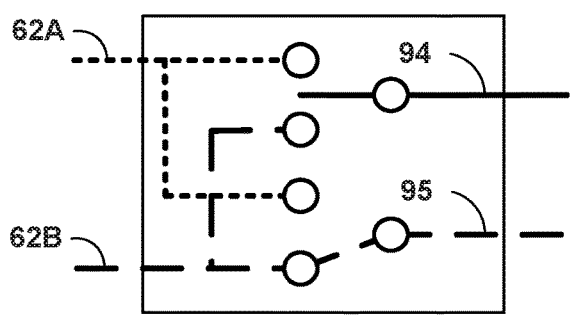
Figure 4E:
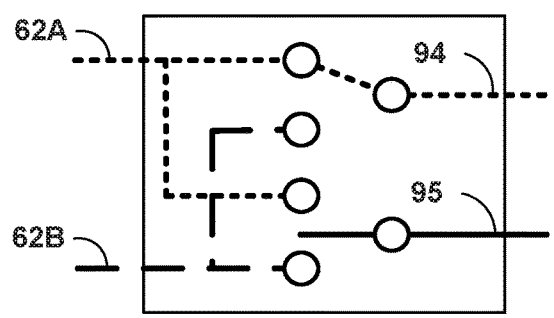
Figure 4C:
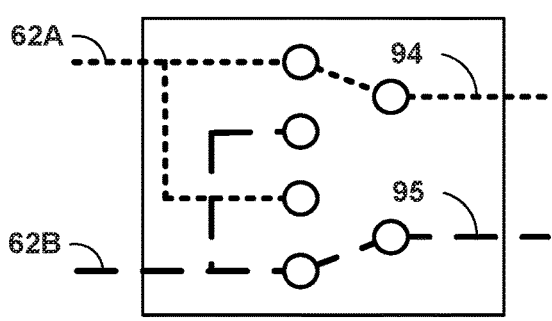
Figure 4F:
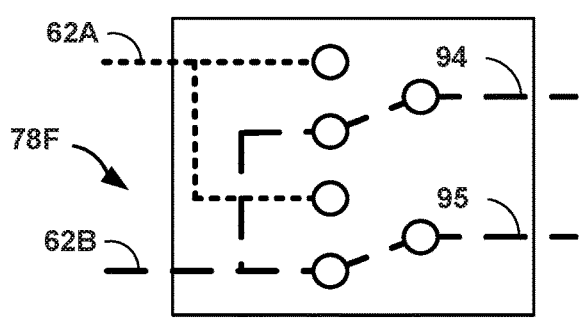
Figure 4D:
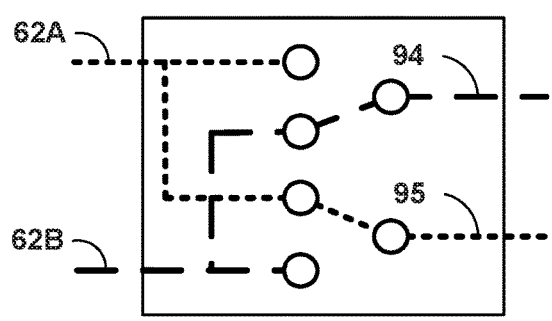
Figure 4G:
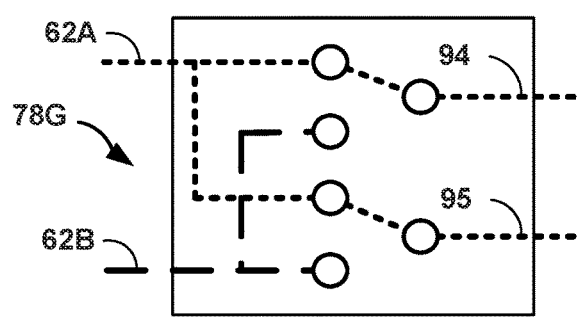

For the example depicted in FIG. 4A, electrical bus 94 may be configured to deliver one of the first AC electricity or the second AC electricity from reconfiguration element 78A to a first propulsor motor to drive a first propulsor fan. Electrical bus 95 may be configured to deliver one of the first AC electricity or the second AC electricity from reconfiguration element 78A to a second propulsor motor to drive a second propulsor fan. Reconfiguration element 78A in FIG. 4A may not connect or refrain from connecting either of electrical busses 94, 95 to either of electrical busses 62A, 62B.

Reconfiguration element 78B may not connect or refrain from connecting electrical bus 94 to either of electrical busses 62A, 62B. Reconfiguration element 78B may connect electrical bus 95 to electrical bus 62B so that a second propulsor motor can drive a second propulsor fan based on a second AC electricity produced by a second generator. When electrical bus 94 is not connected to either of electrical busses 62A, 62B, a first propulsor motor connected to electrical bus 94 may not drive a first propulsor fan. A controller may cause reconfiguration element not to transmit AC electricity to electrical bus 94 for various reasons, such as the first propulsor motor being disabled or to produce less propulsion as compared to connecting both propulsor motors to a generator (see reconfiguration elements 78C, 78D).

Reconfiguration element 78C may connect electrical bus 94 to electrical bus 62A so that a first propulsor motor drives a first propulsor fan based on a first AC electricity produced by a first generator. Reconfiguration element 78C may connect electrical bus 95 to electrical bus 62B so that a second propulsor motor drives a second propulsor fan based on a second AC electricity produced by a second generator. Thus, FIG. 4 may depict each propulsor motor of a synchronous AC electrical system receiving AC electricity produced by a separate generator of the synchronous AC electrical system.

Reconfiguration element 78D may connect electrical bus 94 to electrical bus 62B so that a first propulsor motor drives a first propulsor fan based on a second AC electricity produced by a second generator. Reconfiguration element 78D may connect electrical bus 95 to electrical bus 62A so that a second propulsor motor drives a second propulsor fan based on a first AC electricity produced by a first generator. Thus, FIG. 4D may depict each propulsor motor of a synchronous AC electrical system receiving AC electricity produced by a separate generator of the synchronous AC electrical system.

Reconfiguration element 78E may connect electrical bus 94 to electrical bus 62A so that a first propulsor motor drives a first propulsor fan based on a first AC electricity produced by a first generator. Reconfiguration element 78E may not connect electrical bus 94 to either of electrical busses 62A, 62B. When electrical bus 95 is not connected to either of electrical busses 62A, 62B, a second propulsor motor connected to electrical bus 94 may not drive a second propulsor fan.

Reconfiguration element 78F may connect electrical bus 94 to electrical bus 62B so that a first propulsor motor drives a first propulsor fan based on a second AC electricity produced by a second generator. Reconfiguration element 78F may connect electrical bus 95 to electrical bus 62B so that a second propulsor motor drives a second propulsor fan based on the second AC electricity produced by the second generator. Thus, FIG. 4F may depict reconfiguration element 78F selectively transmitting AC electricity produced by the second generator of a synchronous AC electrical system to each propulsor motor of the synchronous AC electrical system.

Reconfiguration element 78G may connect electrical bus 94 to electrical bus 62A so that a first propulsor motor drives a first propulsor fan based on a first AC electricity produced by a first generator. Reconfiguration element 78G may connect electrical bus 95 to electrical bus 62A so that a second propulsor motor drives a second propulsor fan based on the first AC electricity produced by the first generator. Thus, FIG. 4G may depict reconfiguration element 78G selectively transmitting AC electricity produced by the first generator of a synchronous AC electrical system to each propulsor motor of the synchronous AC electrical system. Reconfiguration elements 78A-78G may allow controller 80 to switch both motors to a single generator in the case of another generator being disabled. Reconfiguration elements 78A-78G may also provide a wider range of operation in generating propulsion from two or more propulsor fans.

Figure 5A:
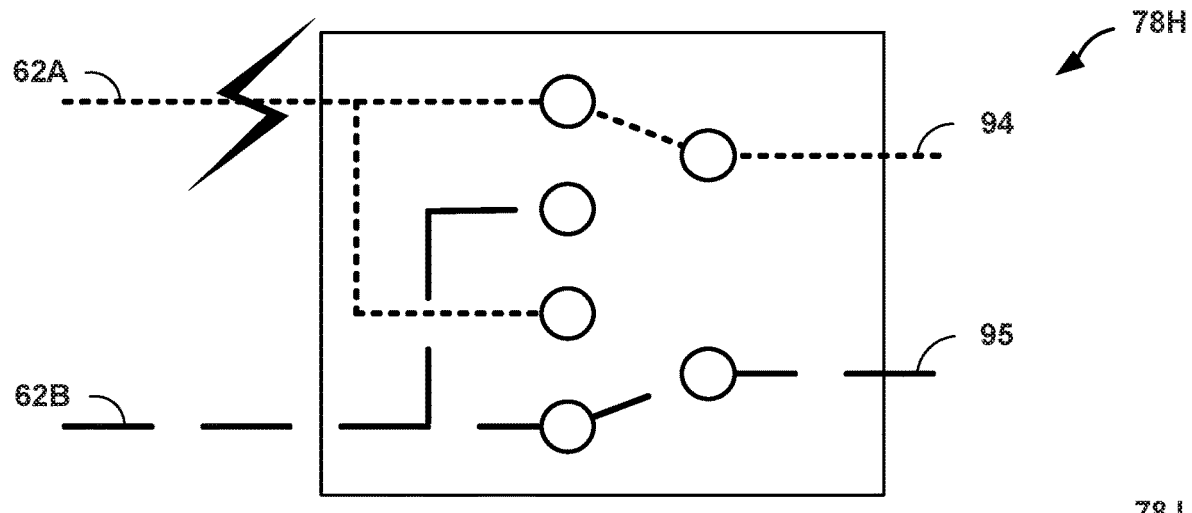
FIGS. 5A-5C are diagrams illustrating reconfiguration elements configured to selectively transmit AC electricity from two generators to two propulsors, in accordance with one or more techniques of this disclosure.
Figure 5B:
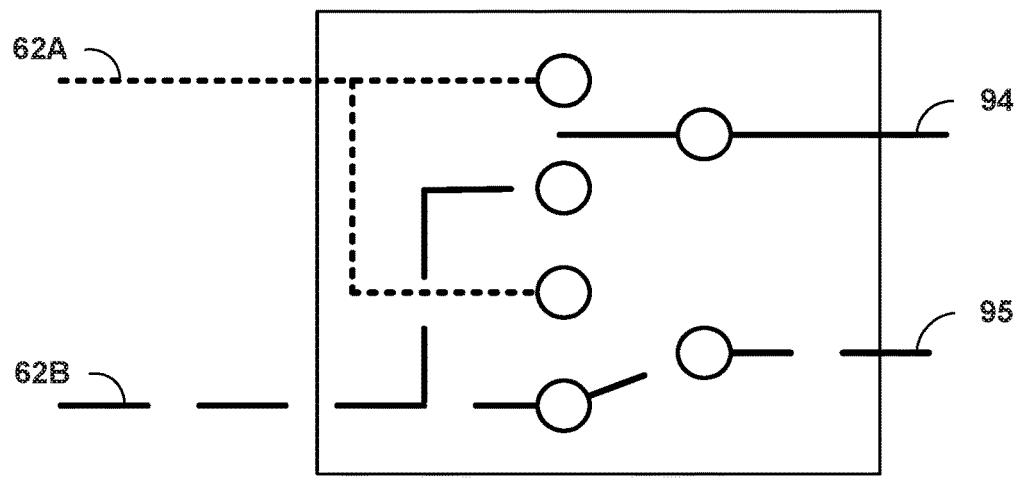
Figure 5C:
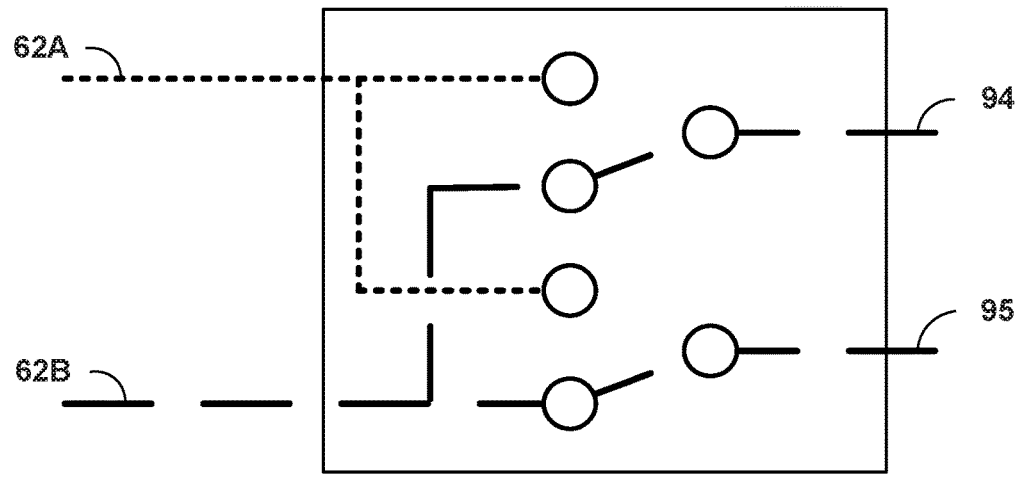

FIGS. 5A-5C are diagrams illustrating reconfiguration elements 78H-78K configured to selectively transmit AC electricity from two generators to two propulsors, in accordance with one or more techniques of this disclosure. For the example depicted in FIG. 5A, electrical bus 62A may be configured to deliver a first AC electricity produced by a first generator to reconfiguration element 78H. Electrical bus 62B may be configured to deliver a second AC electricity produced by a second generator to reconfiguration element 78H.

For the example depicted in FIG. 5A, electrical bus 94 may be configured to deliver one of the first AC electricity or the second AC electricity from reconfiguration element 78H to a first propulsor motor to drive a first propulsor fan. Electrical bus 95 may be configured to deliver one of the first AC electricity or the second AC electricity from reconfiguration element 78H to a second propulsor motor to drive a first propulsor fan. Reconfiguration element 78H in FIG. 5A may connect electrical bus 94 to electrical bus 62A, and reconfiguration element 78H may connect electrical bus 95 to electrical bus 62B.

In some examples, an event may occur that causes electrical bus 62A not to deliver the first AC electricity to reconfiguration element 78H. The event may include a malfunction of a first turbine engine, a malfunction of the first generator, a malfunction of electrical bus 62A, and/or any other disabling event. As depicted in FIG. 5B, the first propulsor motor may not drive the first propulsor fan.

As depicted in FIG. 5B, reconfiguration element 78J may disconnect electrical bus 94 from electrical bus 62A. When electrical bus 94 is not connected to either of electrical busses 62A, 62B, a first propulsor motor connected to electrical bus 94 may not drive a first propulsor fan. As depicted in FIG. 5C, reconfiguration element 78K may connect electrical bus 94 to electrical bus 62B so that a first propulsor motor drives a first propulsor fan based on the second AC electricity produced by the second generator, which may be unaffected by the loss of the first turbine engine. Thus, FIG. 5C may depict reconfiguration element 78K selectively transmitting AC electricity produced by the second generator of a synchronous AC electrical system to each propulsor motor of the synchronous AC electrical system. During the switch over, the first propulsor motor may be synchronized to the second AC electricity by windmilling and/or variation of the shaft speed of the second turbine engine. Each propulsor motor of the synchronous AC electrical system may drive a propulsor fan despite the disabling event to electrical bus 62A. Reconfiguration elements 78H-78K may allow controller 80 to switch both propulsor motors to a generator in the case of the other generator being disabled.

Figure 6:
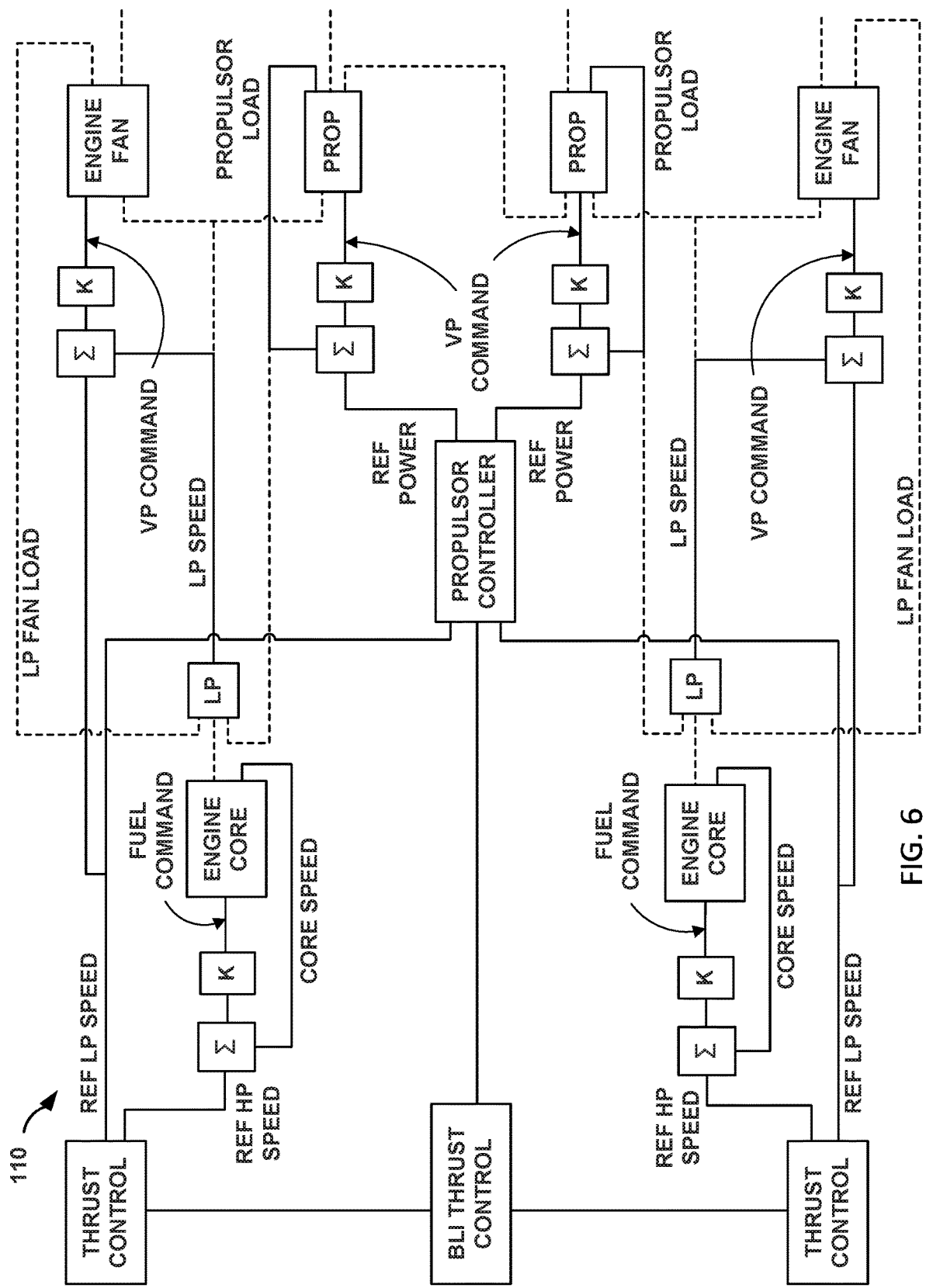
FIGS. 6-8 are conceptual block diagrams illustrating engine core speed control loops with combinations of fixed and variable pitch engine fans and propulsor fans, in accordance with one or more techniques of this disclosure.
Figure 7:
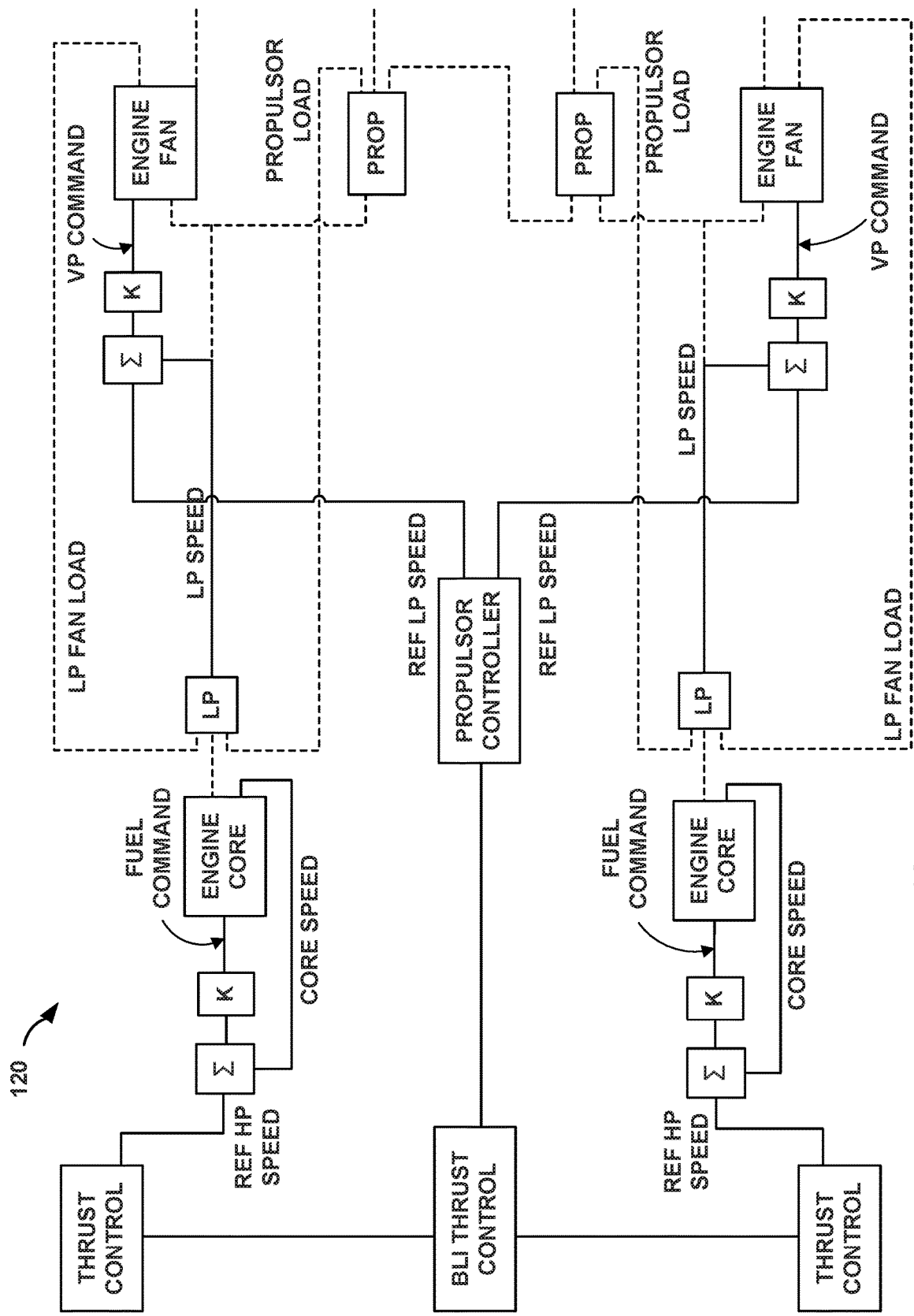
Figure 8:
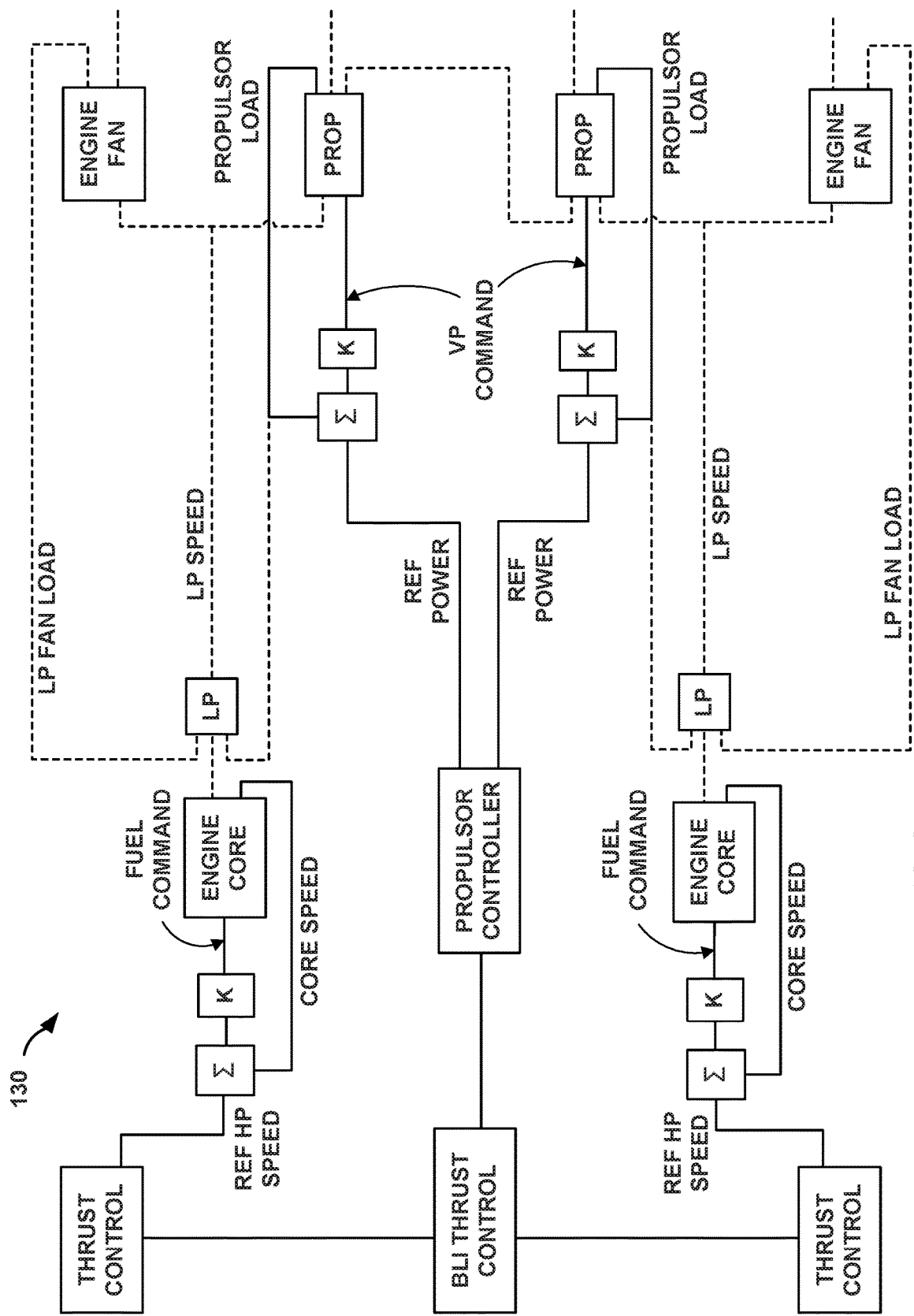

FIGS. 6-8 are conceptual block diagrams illustrating engine core speed control loops with combinations of fixed and variable pitch engine fans and propulsor fans, in accordance with one or more techniques of this disclosure. Each of synchronous AC electrical systems 110, 120, 130 may include one or more engine core speed control loops. Each engine core speed control loop may include a subtraction element Σ, an amplifier K, and an engine core, which may include an HP turbine. Subtraction element Σ may subtract an actual value of core speed or LP speed from a commanded value of core speed or LP speed. Subtraction element Σ may generate an error signal based on the subtraction, an amplifier K may amplify the error signal to generate a fuel command or a VP command. The fuel command for the engine core may be based on the core speed. The core speed may drive the LP speed, which may drive the speed of a propulsor fan through a generator and a propulsor motor (not shown in FIGS. 6-8). In FIGS. 6-11, solid lines may indicate commands, and dashed lines may indicate physical connections.

FIG. 6 may depict variable-pitch (VP) commands on the propulsor fans and VP commands the engine fans, which may include an LP turbine. FIG. 7 may depict VP commands on the engine fans, but not on the propulsor fans. FIG. 8 may depict VP commands on the propulsor fans, but not on the engine fans. The propulsor fans of synchronous AC electrical systems 120 may include fixed-pitch blades, and the engine fans of synchronous AC electrical systems 130 may include fixed-pitch blades.

For synchronous AC electrical systems 110, 130, the propulsor controller may adjust the pitch of the variable-pitch blades of each propulsor fan in order to control the propulsion generated by each propulsor fan. For synchronous AC electrical systems 110, 120, the propulsor controller may adjust the pitch of the variable-pitch blades of each engine fan in order to control the LP speed and consequently the frequency of the AC electricity produced by the respective generators (not shown in FIGS. 6, 8). The engine core speed control loops may enable the controllers of synchronous AC electrical systems 110, 120, 130 to control the propulsion generated by the propulsor fans by controlling the pitch of the variable-pitch blades of the engine fans and/or the propulsor fans. The control of the engine core speed may be independent of the control of the propulsion generated by the propulsor fans.

Figure 9:
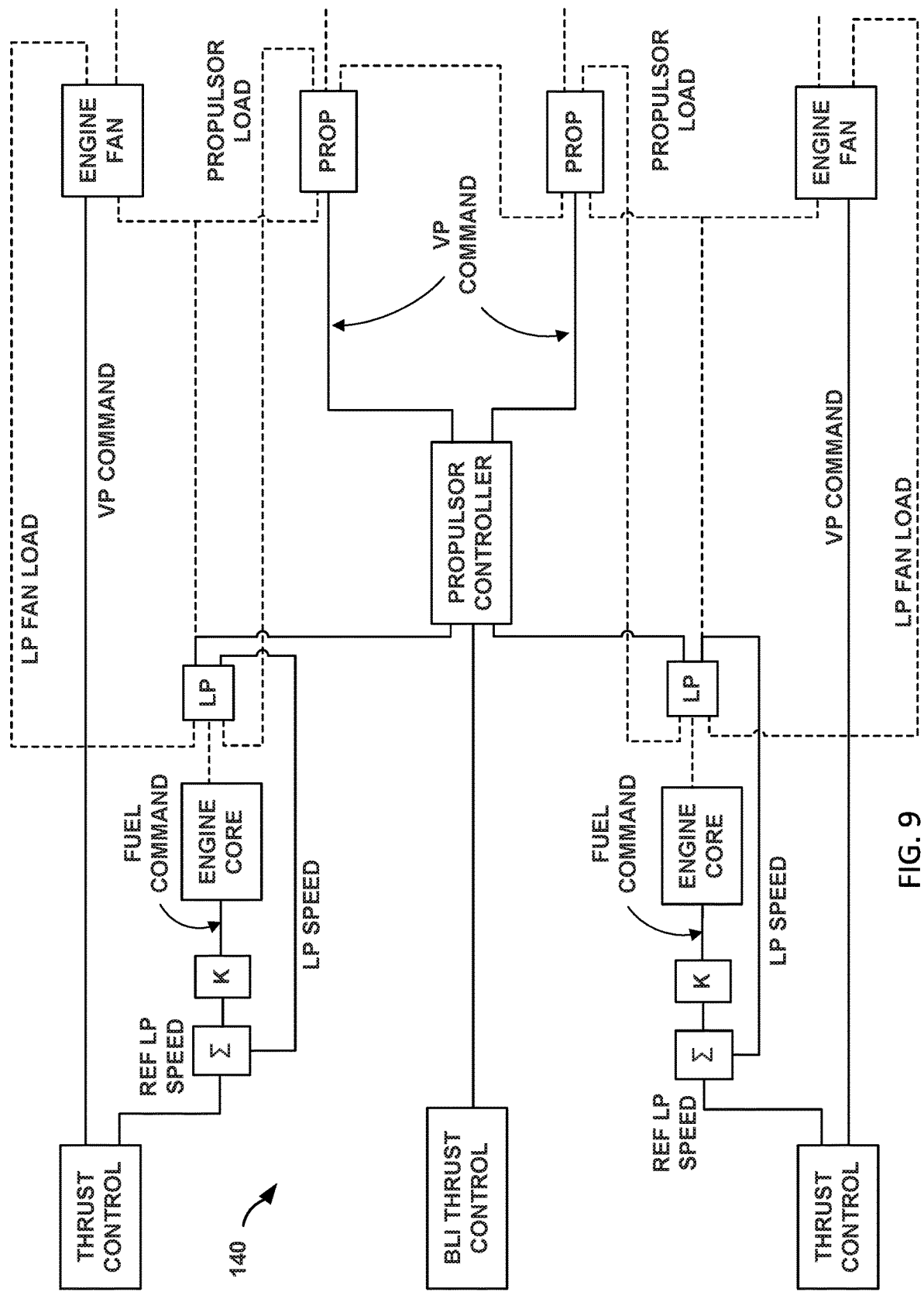
FIGS. 9-11 are conceptual block diagrams illustrating engine low-pressure speed control loops with combinations of fixed and variable pitch engine fans and propulsor fans, in accordance with one or more techniques of this disclosure.
Figure 10:
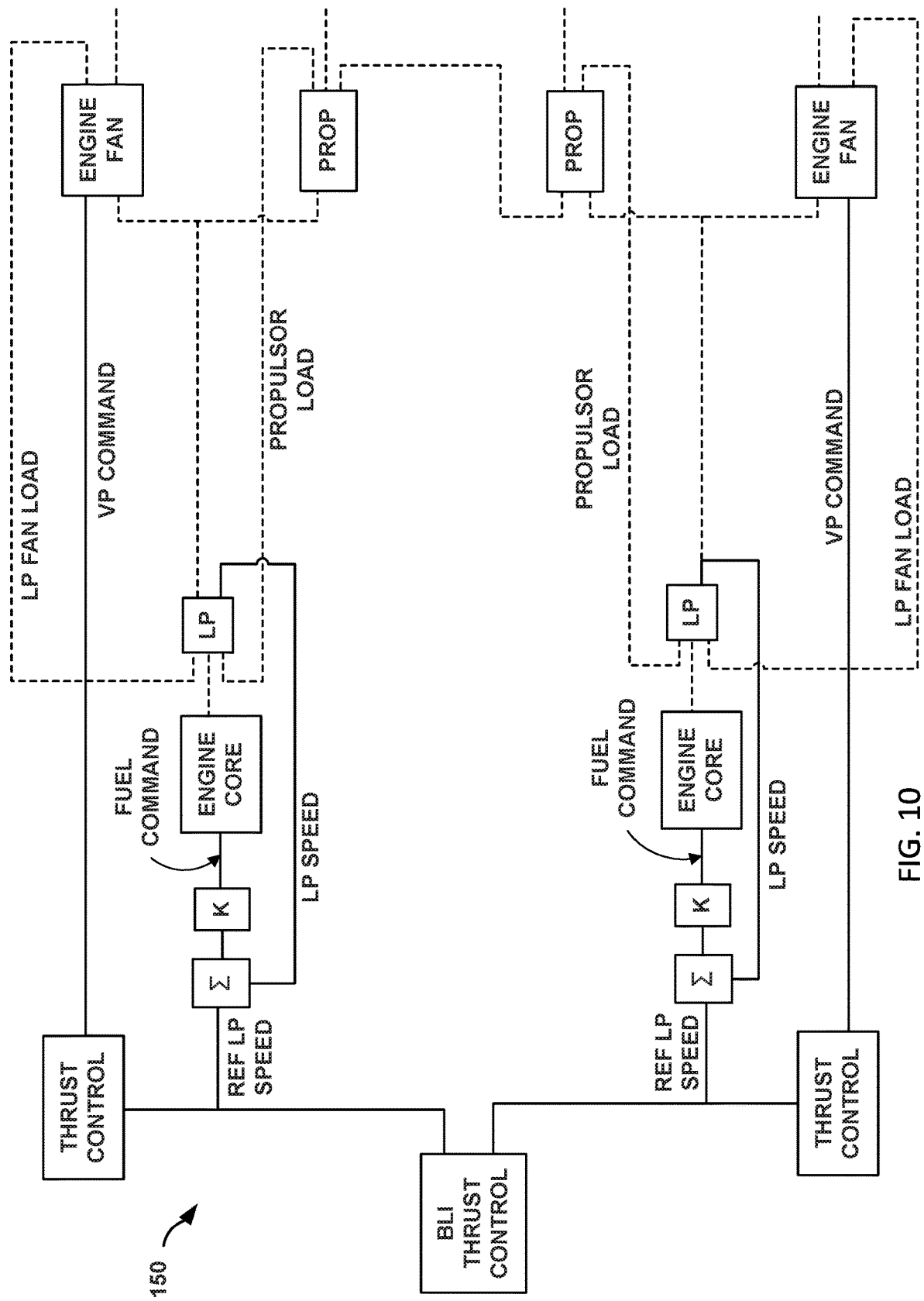
Figure 11:
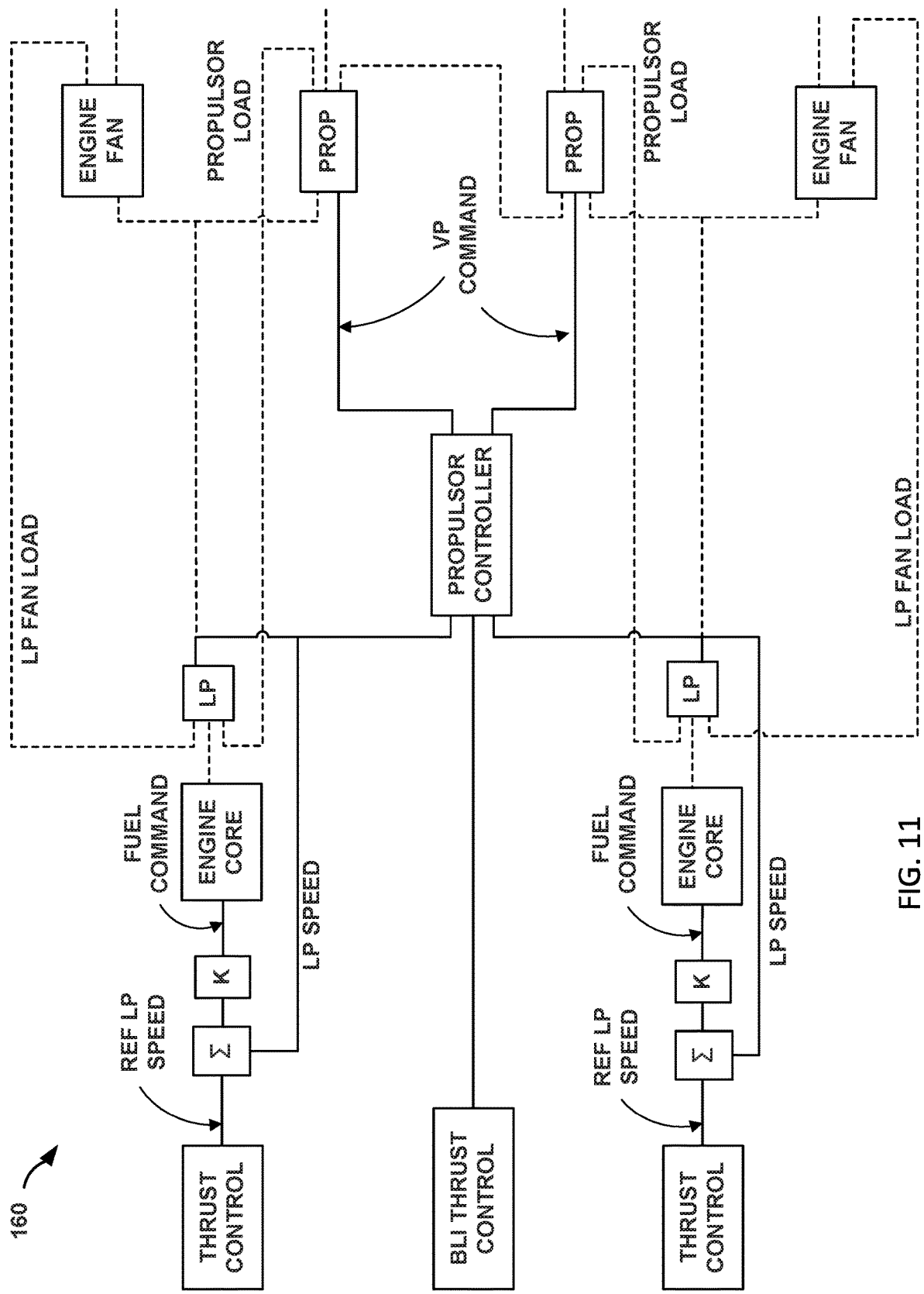

FIGS. 9-11 are conceptual block diagrams illustrating engine LP speed control loops with combinations of fixed and variable pitch engine fans and propulsor fans, in accordance with one or more techniques of this disclosure. Each of synchronous AC electrical systems 140, 150, 160 may include one or more LP speed control loops, each of which may include an adder 2, an amplifier K, an engine core (i.e., an HP turbine), and an LP turbine. The fuel command for the engine core may be based on the LP speed. The core speed may drive the LP speed, which may drive the speed of a propulsor fan through a generator and a propulsor motor (not shown in FIGS. 9-11).

FIG. 9 may depict VP commands on the propulsor fans and VP commands on the engine fans, which may include an LP turbine. FIG. 10 may depict VP commands on the engine fans, but not on the propulsor fans. FIG. 11 may depict VP commands on the propulsor fans, but not on the engine fans. The propulsor fans of synchronous AC electrical systems 150 may include fixed-pitch blades, and the engine fans of synchronous AC electrical systems 160 may include fixed-pitch blades.

For synchronous AC electrical systems 140, 160, the propulsor controller may adjust the pitch of the variable-pitch blades of each propulsor fan in order to control the propulsion generated by each propulsor fan. For synchronous AC electrical systems 140, 150, the thrust controller may adjust the pitch of the variable-pitch blades of each engine fan in order to control the LP speed and consequently the frequency of the AC electricity produced by the respective generators (not shown in FIGS. 9, 11).

In some examples, synchronous AC electrical systems 130, 160 may include variable-pitch blades on the propulsor fans and fixed-pitch blades on the engine fans. The turbine engines in synchronous AC electrical systems 130, 160 may include fixed-pitch blades. Therefore, the frequency of the AC electricity produced by a generator connected to a fixed-pitch turbine engine may be based on the core power and the load applied by the propulsor fan, rather than based on the pitch of the blades of the turbine engine. Thus, the rotation of a propulsor fan may be based on the core speed of a respective turbine engine, and a controller may control the propulsion generated by the propulsor fan by controlling the pitch of the variable-pitch blades of the propulsor fan. The LP speed control loops may enable the controllers of synchronous AC electrical systems 140, 150, 160 to control the particular frequency produced by the generators by controlling either the engine core speed or the pitch of the variable-pitch blades of the engine fans and/or the propulsor fans.

Figure 12:
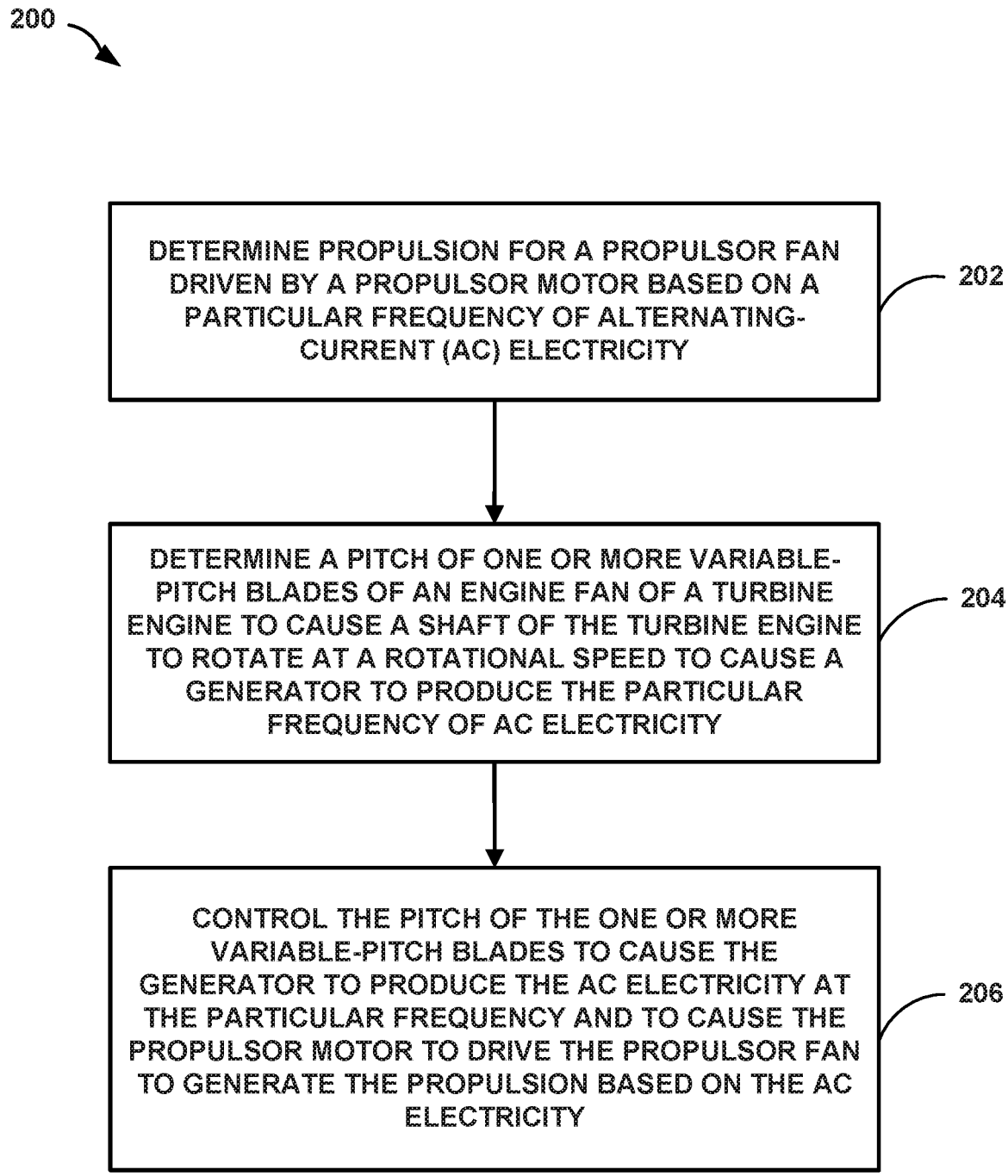
FIG. 12 is a flowchart illustrating an example process implemented by a system including a variable-pitch turbine engine, in accordance with one or more techniques of this disclosure.

FIG. 12 is a flowchart illustrating an example process 200 implemented by a system including a variable-pitch turbine engine, in accordance with one or more techniques of this disclosure. Operations 202-208 of process 200 are described in the context of synchronous AC electrical system 2 and controller 20 of FIG. 1.

Process 200 includes determining a propulsion for a propulsion fan driven by a propulsor motor based on a particular frequency of AC electricity 14 for driving propulsor motor 16 (202). Controller 20 may determine a desired level of propulsion, i.e., thrust, from propulsor fan 18. In some examples, controller 20 may determine a desired level of propulsion from engine fan 7. Controller 20 may also determine the proportion of propulsion from propulsor fan 18 and engine fan 7. Controller 20 may then determine the particular frequency of AC electricity 14 to cause propulsor motor 16 to drive propulsor fan 18 to generate the desired propulsion. Controller 20 may then determine the particular frequency of AC electricity 14 to cause propulsor motor 16 to drive Propulsor fan 18. Controller 20 may determine the rotational speed of shaft 10 to cause generator 12 to produce the particular frequency of AC electricity 14. In some examples, controller 20 may sense AC electricity 14 and the propulsion generated by propulsor fan 18 to determine whether the current frequency of AC electricity is higher or lower than the particular frequency. Controller 20 may use an algorithm to determine the additional propulsion to reach the desired propulsion.

Process 200 also includes determining a pitch of one or more variable-pitch blades 8A-8N of engine fan 7 of turbine engine 4 to cause shaft 10 of turbine engine 4 to rotate at a rotational speed to cause generator 12 to produce the particular frequency of AC electricity 14 (204). The rotational speed of shaft 10 may be based on the pitch of variable-pitch blades 8A-8N. Controller 20 may use an algorithm to determine the pitch of variable-pitch blades 8A-8N that will result in propulsor fan 18 to generate the desired propulsion. In some examples, controller 20 may determine the pitch that will increase the sensed propulsion to the desired propulsion.

Process 200 also includes controlling the pitch of variable-pitch blades 8A-8N of turbine engine 4 to cause generator 12 to produce AC electricity 14 at the particular frequency (206). By controlling the pitch of variable-pitch blades 8A-8N, controller 20 may also cause propulsor motor 16 to drive propulsor fan 18 to generate the propulsion based on AC electricity 14. Controller 20 may transmit a command to a variable-pitch unit to control the pitch of variable-pitch blades 8A-8N. Turbine engine 4 may rotate shaft 10 based on the pitch of variable-pitch blades 8A-8N and the fluid passing through turbine engine 4. Generator 12 may produce AC electricity 14 with a particular frequency based on a rotation of shaft 10. For example, to increase the frequency of AC electricity 14, controller 20 may increase the pitch of variable-pitch blades 8A-8N in order to increase the rotational speed of shaft 10.

Controller 20 may enable a reconfiguration element to deliver the particular frequency of AC electricity 14 to drive the propulsor motor 16 (206). Controller 20 may cause the reconfiguration element, such as reconfiguration element 44 in FIG. 2 or reconfiguration element 78 in FIGS. 3-5C, to electrically connect generator 12 to propulsor motor 16. Propulsor motor 16 may receive AC electricity 14 with the particular frequency of AC electricity 14 produced by generator 12. The particular frequency of AC electricity 14 may be based on the pitch of variable-pitch blades 8A-8N of a turbine engine 4. Propulsor motor 16 may drive propulsor fan 18 to generate propulsion that is based on the particular frequency of AC electricity 14.

FIG. 12 has described the operation of synchronous AC electrical system 2 in general. In some examples, synchronous AC electrical system 2 may include more than one turbine engine, more than one generator, and more than one propulsor fan. Synchronous AC electrical system 2 may also include a reconfiguration element to selectively transmit the AC electricity from one or more generators to one or more propulsor motors. Using the reconfiguration element, synchronous AC electrical system 2 may control the propulsion at each propulsor fan and may respond to disabled turbine engines and disabled generators by switching a propulsor fan to a functioning generator.

The following numbered examples demonstrate one or more aspects of the disclosure.

Example 1

A system includes a turbine engine including an engine fan including one or more variable-pitch blades driven by a shaft, which rotates at a rotational speed which depends on a pitch of the one or more variable-pitch blades of the engine fan. The system further includes a generator configured to produce alternating-current (AC) electricity at a particular frequency relative to the rotational speed of the shaft. The system further includes a propulsor, which includes a propulsor motor and a propulsor fan. The propulsor motor is configured to drive the propulsor fan, based on the AC electricity produced by the generator. The system includes a controller configured to control the particular frequency of the AC electricity by at least controlling the pitch of the one or more variable-pitch blades of the engine fan and thereby the rotational speed of the generator.

Example 2

The system of example 1, wherein the propulsor fan comprises one or more variable-pitch blades; and the controller is further configured to control a propulsion of the propulsor fan by at least controlling a pitch of the one or more variable-pitch blades of the propulsor fan.

Example 3

The system of examples 1 or 2 or any combination thereof, wherein the propulsor fan comprises one or more fixed-pitch blades; and the controller is further configured to control a propulsion of the propulsor fan by at least controlling the pitch of the one or more variable-pitch blades of the engine fan.

Example 4

The system of examples 1-3 or any combination thereof, further including an AC electrical bus configured to transmit the AC electricity from the generator to the propulsor motor.

Example 5

The system of examples 1-4 or any combination thereof, wherein the particular frequency of the AC electricity is based on the rotation of the shaft; and the rotation of the shaft is based on the pitch of the one or more variable-pitch blades of the engine fan.

Example 6

The system of examples 1-5 or any combination thereof, wherein the turbine engine comprises a first turbine engine; the engine fan comprises a first engine fan; the shaft comprises a first shaft; the generator comprises a first generator; the AC electricity comprises a first AC electricity; and the system further includes a second turbine engine including a second engine fan including one or more variable-pitch blades and a second shaft configured to rotate based on a pitch of the one or more variable-pitch blades of the second engine fan, and a second generator configured to produce, based on a rotation of the second shaft, a second AC electricity at a second frequency, wherein the propulsor motor is further configured to drive, selectively based on the first AC electricity produced by the first generator or the second AC electricity produced by the second generator, the propulsor fan, and wherein the controller is further configured to control the second frequency of the second AC electricity by at least controlling the pitch of the one or more variable-pitch blades of the second engine fan.

Example 7

The system of example 6, wherein the propulsor fan comprises a first propulsor fan; the propulsor motor comprises a first propulsor motor; and the system further includes a second propulsor including a second propulsor fan and a second propulsor motor configured to drive, selectively based on the first AC electricity produced by the first generator or the second AC electricity produced by the second generator, the second propulsor fan.

Example 8

The system of example 7, wherein the controller is further configured to control the particular frequency and a phase of the first AC electricity by at least controlling the pitch of the one or more variable-pitch blades of the first engine fan; control the second frequency and a phase of the second AC electricity by at least controlling the pitch of the one or more variable-pitch blades of the second engine fan, wherein the particular frequency of the first AC electricity is equal to the second frequency of the second AC electricity; and the phase of the first AC electricity is equal to the phase of the second AC electricity.

Example 9

The system of examples 7 or 8 or any combination thereof, further including a reconfiguration element, wherein the controller is further configured to cause the reconfiguration element to transmit the first AC electricity to zero, one, or both of the first propulsor motor and the second propulsor motor; and cause the reconfiguration element to transmit the second AC electricity to zero, one, or both of the first propulsor motor and the second propulsor motor.

Example 10

A method for generating propulsion, the method including determining a propulsion for a propulsion fan driven by a propulsor motor based on a particular frequency of alternating-current (AC) electricity; determining a pitch of one or more variable-pitch blades of an engine fan of a turbine engine to cause a shaft of the turbine engine to rotate at a rotational speed to cause a generator to produce the particular frequency of AC electricity; controlling the pitch of the one or more variable-pitch blades to cause the generator to produce the AC electricity at the particular frequency and the propulsor motor to drive the propulsor fan to generate the propulsion based on the AC electricity.

Example 11

The method of example 10, further including controlling a propulsion of the propulsor fan by at least controlling a pitch of one or more variable-pitch blades of the propulsor fan.

Example 12

The method of examples 10-11 or any combination thereof, further including enabling a reconfiguration element to deliver the particular frequency of the AC electricity to drive the propulsor motor.

Example 13

The method of examples 10-12 or any combination thereof, further comprising determining the particular frequency of the AC electricity based on the propulsion; determining the rotational speed of the shaft based on the particular frequency of the AC electricity, wherein determining the pitch of the one or more variable-pitch blades of the engine fan is based on the rotational speed.

Example 14

The method of examples 10-13 or any combination thereof, wherein the turbine engine comprises a first turbine engine, the method further including determining a second pitch of one or more variable-pitch blades of a second engine fan of a second turbine engine to cause a second shaft of the second turbine engine to rotate at a second rotational speed to cause a second generator to produce a second frequency of a second AC electricity; and controlling the second pitch of one or more variable-pitch blades of the second engine fan to cause a second generator to produce the second AC electricity at the second frequency. The method further includes enabling a reconfiguration element to selectively deliver the particular frequency of the first AC electricity or the second frequency of the second AC electricity to drive the propulsor motor, wherein the propulsor motor is configured to drive, selectively based on the first AC electricity produced by the first generator or the second AC electricity produced by the second generator, the propulsor fan.

Example 15

The method of example 14, further including enabling the reconfiguration element to selectively deliver the second frequency of the second AC electricity to drive a second propulsor motor, wherein the second propulsor motor is configured to drive, based on the second AC electricity, a second propulsor fan.

Example 16

The method of examples 14 or 15 or any combination thereof, further comprising controlling the pitch of the one or more variable-pitch blades of the engine fan of the first turbine engine and the pitch of the one or more variable-pitch blades of the second engine fan to cause the particular frequency of the first AC electricity to be equal to the second frequency of the second AC electricity; and a phase of the first AC electricity to be equal to a phase of the second AC electricity.

Example 17

The method of examples 15 or 16 or any combination thereof, further including enabling the reconfiguration element to selectively deliver the particular frequency of the first AC electricity to zero, one, or both of the first propulsor motor and the second propulsor motor; and enabling the reconfiguration element to selectively deliver the second frequency of the second AC electricity to zero, one, or both of the first propulsor motor and the second propulsor motor.

Example 18

A system including a first turbine engine including a first engine fan including one or more variable-pitch blades and a first shaft configured to rotate based on a pitch of the one or more variable-pitch blades of the first engine fan. The system also includes a first generator configured to produce, based on a rotation of the first shaft, first alternating-current (AC) electricity at a first frequency. The system further includes a second turbine engine including a second engine fan including one or more variable-pitch blades and a second shaft configured to rotate based on a pitch of the one or more variable-pitch blades of the second engine fan. The system may also include a second generator configured to produce, based on a rotation of the second shaft, second alternating-current (AC) electricity at a second frequency. The system further includes a propulsor including a propulsor fan and a propulsor motor configured to drive, selectively based on the first AC electricity produced by the first generator or the second AC electricity produced by the second generator, the propulsor fan. The system includes a controller configured to control the first frequency of the AC electricity by at least controlling the pitch of the one or more variable-pitch blades of the first engine fan, and control the second frequency of the AC electricity by at least controlling the pitch of the one or more variable-pitch blades of the second engine fan.

Example 19

The system of example 18, further including a reconfiguration element, wherein the controller is further configured to selectively cause the reconfiguration element to transmit the first AC electricity or the second AC electricity to the propulsor motor. The controller is further configured to control a propulsion of the propulsor fan by at least controlling a pitch of the one or more variable-pitch blades of the first engine fan or controlling a pitch of the one or more variable-pitch blades of the second engine fan.

Example 20

The system of example 19, wherein the propulsor fan comprises a first propulsor fan, and the propulsor motor comprises a first propulsor motor. The system further comprises a second propulsor including a second propulsor fan and a second propulsor motor configured to drive, selectively based on the first AC electricity produced by the first generator or the second AC electricity produced by the second generator, the second propulsor fan. The controller is further configured to selectively cause the reconfiguration element to transmit the first AC electricity or the second AC electricity to the second propulsor motor, and control a propulsion of the second propulsor fan by at least controlling a pitch of the one or more variable-pitch blades of the first engine fan or controlling a pitch of the one or more variable-pitch blades of the second engine fan.

Various examples have been described. These and other examples are within the scope of the following claims.

What is claimed is:

1. A system comprising:
a turbine engine including an engine fan including one or more variable-pitch blades driven by a shaft, which rotates at a rotational speed which depends on a pitch of the one or more variable-pitch blades of the engine fan;
a generator configured to produce alternating-current (AC) electricity at a particular frequency based on the rotational speed of the shaft;
a propulsor, which comprises a propulsor motor and a propulsor fan, wherein the propulsor motor is configured to drive the propulsor fan, based on the AC electricity produced by the generator; and
a controller configured to:
determine a target level of propulsion for the propulsor fan;
determine a target pitch for the one or more variable-pitch blades of the engine fan to cause the propulsor fan to generate the target level of propulsion; and
control a propulsion of the propulsor fan by at least controlling the pitch of the one or more variable-pitch blades of the engine fan and thereby the rotational speed of the generator.

2. The system of claim 1, wherein:
the one or more variable-pitch blades of the engine fan are a first set of one or more variable-pitch blades;
the propulsor fan comprises a second set of one or more variable-pitch blades; and
the controller is further configured to control the propulsion of the propulsor fan by at least controlling a pitch of the second set of one or more variable-pitch blades of the propulsor fan.

3. The system of claim 1, wherein the propulsor fan comprises one or more fixed-pitch blades.

4. The system of claim 1, further comprising an AC electrical bus configured to transmit the AC electricity from the generator to the propulsor motor.

5. The system of claim 1, wherein:
the turbine engine comprises a first turbine engine;
the engine fan comprises a first engine fan including a first set of one or more variable-pitch blades;
the shaft comprises a first shaft;
the generator comprises a first generator;
the AC electricity comprises a first AC electricity; and
the system further comprises:
a second turbine engine including a second engine fan including a second set of one or more variable-pitch blades and a second shaft configured to rotate based on a pitch of the second set of one or more variable-pitch blades of the second engine fan, and
a second generator configured to produce, based on a rotation of the second shaft, a second AC electricity at a second frequency, wherein the propulsor motor is further configured to drive, selectively based on the first AC electricity produced by the first generator or the second AC electricity produced by the second generator, the propulsor fan, and
wherein the controller is further configured to:
determine a second target pitch for the second set of one or more variable-pitch blades of the second engine fan to cause the propulsor fan to generate the target level of propulsion; and
control the propulsion of the propulsor fan by at least controlling the pitch of the second set of one or more variable-pitch blades of the engine fan.

6. The system of claim 5, wherein:
the propulsor fan comprises a first propulsor fan;
the propulsor motor comprises a first propulsor motor; and
the system further comprises a second propulsor including a second propulsor fan and a second propulsor motor configured to drive, selectively based on the first AC electricity produced by the first generator or the second AC electricity produced by the second generator, the second propulsor fan.

7. The system of claim 6, wherein the controller is further configured to:
control the particular frequency and a phase of the first AC electricity by at least controlling the pitch of the first set of one or more variable-pitch blades of the first engine fan;
control the second frequency and a phase of the second AC electricity by at least controlling the pitch of the second set of one or more variable-pitch blades of the second engine fan, wherein:
the particular frequency of the first AC electricity is equal to the second frequency of the second AC electricity; and
the phase of the first AC electricity is equal to the phase of the second AC electricity.

8. The system of claim 6, further comprising a reconfiguration element, wherein the controller is further configured to:
cause the reconfiguration element to transmit the first AC electricity to zero, one, or both of the first propulsor motor and the second propulsor motor; and
cause the reconfiguration element to transmit the second AC electricity to zero, one, or both of the first propulsor motor and the second propulsor motor.

9. The system of claim 1, wherein the controller is configured to control the particular frequency of the AC electricity by at least controlling the pitch of the one or more variable-pitch blades of the engine fan and thereby the rotational speed of the generator.

10. A method for generating propulsion, the method comprising:
determining a target level of propulsion for a propulsor fan driven by a propulsor motor, wherein the propulsor motor drives the propulsor fan based on a particular frequency of alternating-current (AC) electricity;
determining a target pitch of one or more variable-pitch blades of an engine fan of a turbine engine to cause a shaft of the turbine engine to rotate at a rotational speed to cause a generator to produce the particular frequency of AC electricity and to cause the propulsor fan to generate the target level of propulsion; and
controlling a pitch of the one or more variable-pitch blades to cause:
the generator to produce the AC electricity at the particular frequency, and
the propulsor motor to drive the propulsor fan to generate the target level of propulsion based on the AC electricity.

11. The method of claim 10, wherein the one or more variable-pitch blades of the engine fan are a first set of one or more variable-pitch blades, the method further comprising controlling a propulsion of the propulsor fan by at least controlling a pitch of a second set of one or more variable-pitch blades of the propulsor fan.

12. The method of claim 10, further comprising enabling a reconfiguration element to deliver the particular frequency of the AC electricity to drive the propulsor motor.

13. The method of claim 10,
wherein the turbine engine comprises a first turbine engine,
wherein the engine fan is a first engine fan including a first set of one or more variable-pitch blades,
the method further comprising:
  determining a second target pitch of a second set of one or more variable-pitch blades of a second engine fan of a second turbine engine to cause a second shaft of the second turbine engine to rotate at a second rotational speed to cause a second generator to produce a second frequency of a second AC electricity to cause the propulsor fan to generate the target level of propulsion;
  controlling the second pitch of the second set of one or more variable-pitch blades of the second engine fan to cause a second generator to produce the second AC electricity at the second frequency;
  enabling a reconfiguration element to selectively deliver the particular frequency of the first AC electricity or the second frequency of the second AC electricity to drive the propulsor motor, wherein the propulsor motor is configured to drive, selectively based on the first AC electricity produced by the first generator or the second AC electricity produced by the second generator, the propulsor fan.

14. The method of claim 13,
wherein the propulsor motor is a first propulsor motor,
the method further comprising enabling the reconfiguration element to selectively deliver the second frequency of the second AC electricity to drive a second propulsor motor,
wherein the second propulsor motor is configured to drive, based on the second AC electricity, a second propulsor fan.

15. The method of claim 14, further comprising controlling the pitch of the first set of one or more variable-pitch blades of the first engine fan of the first turbine engine and the pitch of the second set of one or more variable-pitch blades of the second engine fan to cause:
  the particular frequency of the first AC electricity to be equal to the second frequency of the second AC electricity; and
  a phase of the first AC electricity to be equal to a phase of the second AC electricity.

16. The method of claim 14, further comprising:
enabling the reconfiguration element to selectively deliver the particular frequency of the first AC electricity to zero, one, or both of the first propulsor motor and the second propulsor motor; and
enabling the reconfiguration element to selectively deliver the second frequency of the second AC electricity to zero, one, or both of the first propulsor motor and the second propulsor motor.

17. A system comprising:
a first turbine engine including a first engine fan including a first set of one or more variable-pitch blades and a first shaft configured to rotate based on a pitch of the first set of one or more variable-pitch blades of the first engine fan;
a first generator configured to produce, based on a rotation of the first shaft, first alternating-current (AC) electricity at a first frequency;
a second turbine engine including a second engine fan including a second set of one or more variable-pitch blades and a second shaft configured to rotate based on a pitch of the second set of one or more variable-pitch blades of the second engine fan;
a second generator configured to produce, based on a rotation of the second shaft, second alternating-current (AC) electricity at a second frequency;
a propulsor including a propulsor fan and a propulsor motor configured to drive, selectively based on the first AC electricity produced by the first generator or the second AC electricity produced by the second generator, the propulsor fan; and
a controller configured to:
  determine a target level of propulsion for the propulsor fan;
  determine a first target pitch for the first set of one or more variable-pitch blades of the first engine fan to cause the propulsor fan to generate the target level of propulsion;
  determine a second target pitch for the second set of one or more variable-pitch blades of the second engine fan to cause the propulsor fan to generate the target level of propulsion;
  control a propulsion of the propulsor fan by at least controlling the pitch of the first set of one or more variable-pitch blades of the first engine fan or controlling the pitch of the second set of one or more variable-pitch blades of the second engine fan.

18. The system of claim 17, further comprising a reconfiguration element, wherein the controller is further configured to selectively cause the reconfiguration element to transmit the first AC electricity or the second AC electricity to the propulsor motor.

19. The system of claim 18, wherein:
the propulsor fan comprises a first propulsor fan;
the propulsor motor comprises a first propulsor motor; and
the system further comprises a second propulsor including a second propulsor fan and a second propulsor motor configured to drive, selectively based on the first AC electricity produced by the first generator or the second AC electricity produced by the second generator, the second propulsor fan,
wherein the controller is further configured to:
  selectively cause the reconfiguration element to transmit the first AC electricity or the second AC electricity to the second propulsor motor, and
  control a propulsion of the second propulsor fan by at least controlling the pitch of the first set of one or more variable-pitch blades of the first engine fan or controlling the pitch of the second set of one or more variable-pitch blades of the second engine fan.

20. The system of claim 17,
wherein the controller is configured to control the first frequency of the first AC electricity by at least controlling the pitch of the first set of one or more variable-pitch blades of the first engine fan and thereby the rotational speed of the first generator,
wherein the controller is configured to control the second frequency of the second AC electricity by at least controlling the pitch of the second set of one or more variable-pitch blades of the second engine fan and thereby the rotational speed of the second generator.

* * * * *